Figure 1:
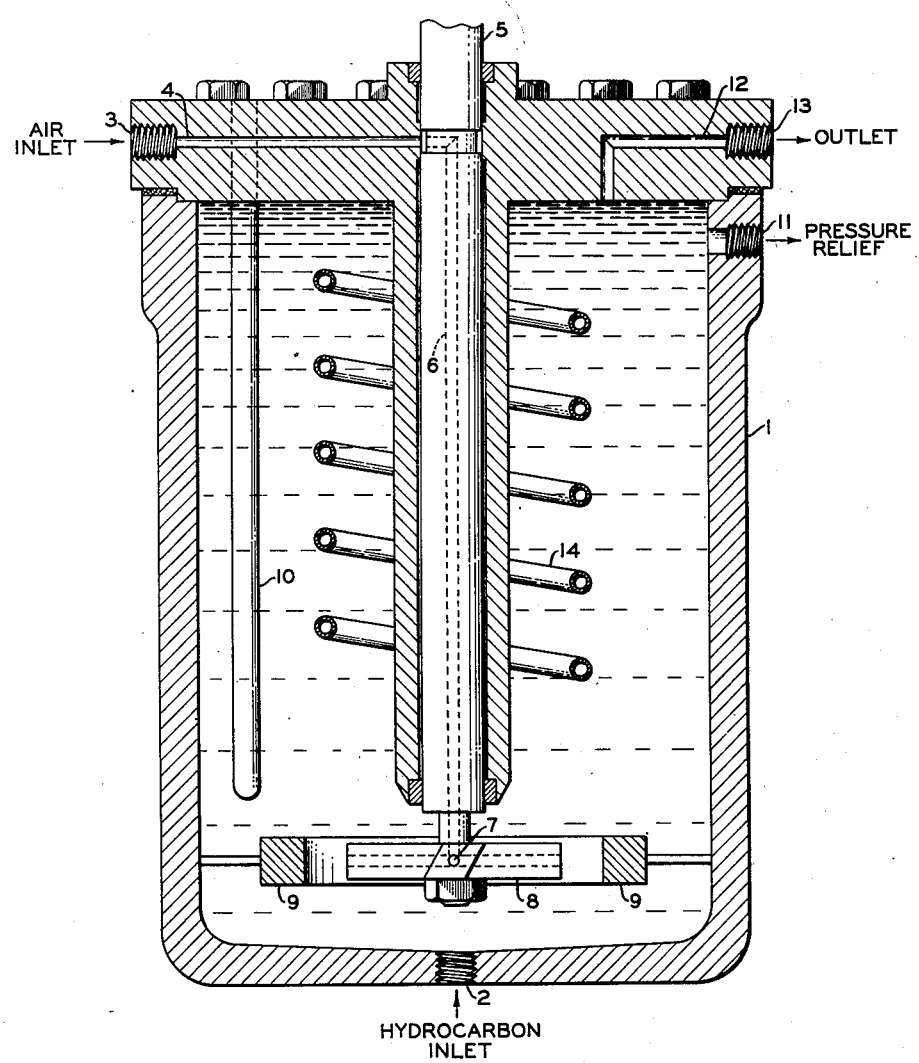

Oct. 28, 1952     C. F. DOUGHERTY, JR., ET AL     2,615,921
HYDROCARBON OXIDATION

Filed Nov. 7, 1949     2 SHEETS—SHEET 1

INVENTORS
C. F. DOUGHERTY, JR.
C. C. CHAPMAN
BY
Hudson and Young
ATTORNEYS

Oct. 28, 1952  C. F. DOUGHERTY, JR., ET AL  2,615,921
HYDROCARBON OXIDATION
Filed Nov. 7, 1949  2 SHEETS—SHEET 2

RESIDENCE TIME VS. OXIDATION TEMPERATURE
FOR METHYLCYCLOHEXANE

REACTION TEMPERATURE VS. OXYGEN CONSUMPTION

INVENTORS
C. F. DOUGHERTY, JR.
C. C. CHAPMAN

BY Hudson and Young
ATTORNEYS

Patented Oct. 28, 1952

2,615,921

UNITED STATES PATENT OFFICE 2,615,921

HYDROCARBON OXIDATION

Charles Francis Dougherty, Jr., Bartlesville, Okla., and Charles C. Chapman, Phillips, Tex., assignors to Phillips Petroleum Company, a corporation of Delaware Application November 7, 1949, Serial No. 126,024

14 Claims. (Cl. 260—586)

This invention relates to the oxidation of hydrocarbons. In a specific aspect this invention relates to an improved method for the oxidation of naphthenic hydrocarbons. In one specific embodiment this invention relates to an improved method for the oxidation of methylcyclohexane for the production of the corresponding hydroperoxides, alcohols and ketones.

Numerous processes have been disclosed in the prior art for the oxidation of various hydrocarbons and hydrocarbon mixtures. Liquid phase oxidation has been found to be quite effective, and usually a vertically disposed reaction chamber is employed wherein a liquid level is maintained at a point intermediate the ends of the reactor. Air or other oxygen-containing gas is admitted to the lower portion of the reaction chamber through a suitable distributor, such as a sparger coil, and the liquid hydrocarbon to be oxidized is also admitted to the lower portion of the reaction chamber. Liquid oxidate is withdrawn from an intermediate point in the reactor below the liquid level which usually is automatically controlled by a liquid level controller. Off-gas from the oxidation reaction is present in the vapor space in the reaction chamber above the liquid level, and off-gas is withdrawn from the chamber through a condenser and a back pressure valve which controls the pressure in the chamber. A hydrocarbon insoluble liquid phase containing organic acids, polymeric material and other undesirable oxidation products collects in the bottom of the reaction chamber, and it must be withdrawn to assure successful operation of the process. In other similar oxidation processes the hydrocarbon to be oxidized is introduced to the upper section of the reaction chamber, and it passes downwardly countercurrent to an oxygen-containing gas which flows upwardly through the reaction chamber. Off-gas collects in and is withdrawn from the vapor space above the liquid level in the reaction chamber, and liquid oxidate is withdrawn from the bottom of the reactor.

In these prior art processes the vapor in the upper portion of the reaction chamber is hazardous since it contains oxygen and hydrocarbon vapors, and the elimination of this dangerous feature is highly desirable. Also, in these processes a considerable temperature differential exists within the reaction chamber, and the reaction is localized within specific zones in the liquid phase reaction mixture. In fact, a reaction front or band tends to move upwardly through the reaction mixture resulting in overoxidation in certain zones or areas and little or no oxidation in other zones or areas. This condition is deleterious, and it causes increased yields of undesired oxidation products, such as acids and polymers, with a consequent decrease in the yield of hydroperoxides, alcohols and ketones. Further, in these prior art processes, three streams are withdrawn from the reaction chamber, viz., the off-gas, the oxidate or hydrocarbon soluble phase and the hydrocarbon insoluble phase. Withdrawal of each of these streams is controlled either manually or automatically, and it is difficult to control the rate of withdrawal of each of these streams in a manner that optimum operating conditions can be maintained. Actually, the operating conditions, such as temperature, hydrocarbon residence time and the like, vary considerably, and, as a result, relatively poor yields of the desired oxidation products are obtained.

It is an object of this invention to provide a novel process for the oxidation of hydrocarbons.

It is another object of this invention to provide a novel process for the oxidation of naphthenic hydrocarbons to produce the corresponding hydroperoxides, alcohols and ketones.

It is a further object of this invention to provide a novel process for the oxidation of methylcyclohexane to produce the corresponding hydroperoxides, alcohols and ketones.

It is a further object of this invention to provide a process for oxidizing hydrocarbons which eliminates difficulties of the prior art processes.

Further and additional objects of this invention will be apparent from the disclosure hereinbelow.

We have found that, in the oxidation of hydrocarbons, difficulties encountered in prior art processes can be eliminated and that improved yields of desired oxidation products can be obtained by effecting the reaction in a liquid-full reactor. The hydrocarbon is oxidized in the liquid phase, and the liquid level is maintained in contact with the upper extremity of the reaction chamber.

The hydrocarbons that are oxidized in accordance with our process are those hydrocarbons that are liquid at the reaction conditions. These hydrocarbons preferably contain from 4 to 20 carbon atoms per molecule, and they include aromatics, aliphatics, cycloaliphatics, aralkyls and alkaryls. Typical examples of these hydrocarbons are butane, pentane, hexane, heptane, octane, cyclobutane, cyclopentane, cyclohexane, methylcyclohexane, cycloheptane, benzene, toluene, xylene, ethylbenzene, tertiary-butylisopropyl benzene, diisopropylbenzene, cyclohexylbenzene, propylbenzene and butylbenzene. Our process is preferably directed to the oxidation of the cycloaliphatic or naphthenic type of hydrocarbons, and, in addition to the specific cycloaliphatic hydrocarbons named above, their mono- and polysubstituted derivatives wherein the substituent groups may be alkyl, cycloalkyl, aryl and aralkyl are included. Typical examples of these substituent groups are methyl, ethyl, propyl, butyl, pentyl, cyclopropyl, cyclobutyl, cyclopentyl, cyclohexyl, phenyl, benzyl, tolyl, xylyl, and the like. Either one or combinations of two or more of the substituent groups may be present in the hydrocarbon employed. Also, the hydrocarbon may be a condensed ring naphthene. Typical examples of this type of hydrocarbon are bicyclo-(0,1,3)-hexane, bicyclo-(1,1,3)-heptane and bicyclo-(0,2,4)-octane, and these condensed ring naphthenes may have attached thereto substituent radicals, such as the alkyl, cycloalkyl, aryl and aralkyl groups enumerated above or combinations of two or more of these groups. Each of the hydrocarbons within the scope of our invention may be oxidized separately or mixtures containing two or more of these hydrocarbons may be oxidized. For example, selected fractions of straight-run gasolines which contain relatively high percentages, say, about 30 per cent or higher, of naphthenic hydrocarbons may be oxidized in our process. We will describe our process in detail with specific reference to methylcyclohexane as the hydrocarbon to be oxidized.

The oxidizing medium for our process is an oxygen-containing gas, such as air, and the molar ratio of oxygen to hydrocarbon is within the range of 0.05 to 0.3, preferably from 0.07 to 0.2. The reaction temperature for our process is within the range of 230 to 450° F., however, in order to produce an oxidate comprising a mixture of hydroperoxides, alcohols, and ketones from $C_5$ to $C_8$ naphthenic hydrocarbons and their alkyl substituted derivatives, the preferable reaction temperature is above 300° F. and within the range of 320 to 370° F. If it is desired to produce an oxidate comprising essentially hydroperoxide, it is preferred to decrease the reaction temperature to within the range of 230 to 300° F. and concomitantly to increase the residence time. The operating pressure is at least sufficient to maintain liquid phase within the reaction zone. Specifically, the pressure for the reaction will fall within the range of 50 to 3,000 pounds per square inch, preferably 150 to 500 pounds per square inch. The liquid residence time within the reactor or the reaction contact time ranges from 1 to 60 minutes, preferably from 2 to 15 minutes.

Our process is adaptable to batch operation, for example, by introducing the hydrocarbon to be oxidized to the reactor and then passing the oxygen-containing gas through the reactor until the desired amount of oxidation has been effected. We will, however, describe our process as applied to a continuous operation by reference to the accompanying Figure 1, which is a cross-sectional view of a reactor for the oxidation of hydrocarbons. Such conventional equipment as motors, safety heads and the like have not been shown on this drawing, but their inclusion is a variation which is readily apparent to one skilled in the art.

The hydrocarbon to be oxidized is introduced to the reactor, preferably at or near the bottom, at a rate sufficient to maintain the desired residence time of the liquid phase in the reactor. The oxygen-containing gas is also introduced to the reactor in a suitable manner to effect the desired oxygen to hydrocarbon ratio. The manner of introducing the oxygen-containing gas is such that intimate contacting of the gas and liquid hydrocarbon is produced. The gas may be introduced through a sparger coil or other equivalent device, but we prefer to introduce the gas through the shaft of a mechanical mixer or agitator. In this manner the oxygen-containing gas is uniformly dispersed throughout the liquid in the reactor and localized reaction zones are avoided.

Figure 2:
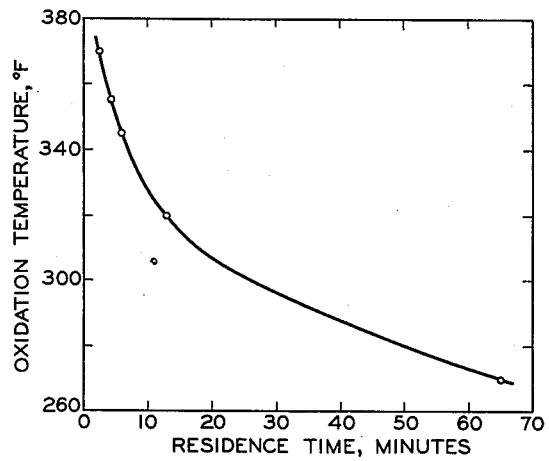
Figure 3:
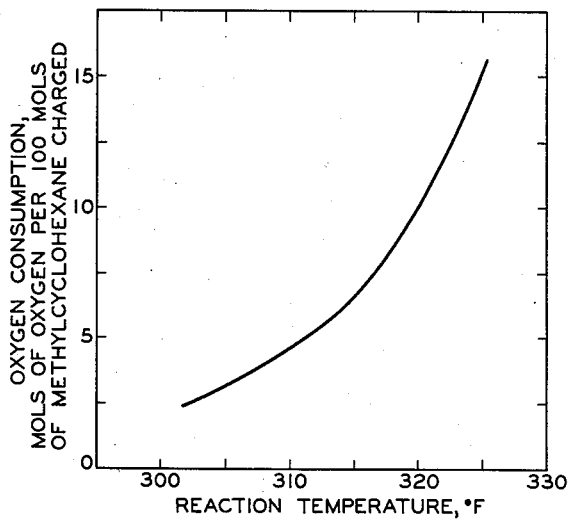

The optimum operating temperature for the oxidation reaction must be correlated with the residence time of the hydrocarbon in the reactor, and the reaction is carried out at the minimum temperature at which at least 90 per cent of the oxygen admitted to the reactor is consumed. In order to operate at these conditions, we have found it desirable to initiate the reaction in a special manner, as disclosed in the copending application of W. M. Hutchinson and C. F. Dougherty, Jr., Serial No. 136,684, filed January 4, 1950. To initiate the reaction, hydrocarbon, specifically methylcyclohexane, is introduced to the reactor at a temperature within the range of 200 to 400° F. and preferably at least 50° F. below the temperature at which the initiation of the oxidation reaction is expected. Oxygen or an oxygen-containing gas is passed to the reactor at a rate so as to maintain a molar ratio of oxygen to hydrocarbon within the range of 0.02 to 0.3, preferably 0.05 to 0.2. The temperature of the hydrocarbon being passed to the reactor is then gradually increased until the consumption of the oxygen is at least 90 per cent or until the oxygen content of the off-gas from the reactor drops to one per cent or less at which time it may be assumed that the oxidation reaction has been initiated. For an optimum yield of alcohols and ketones and for a maximum oxygen efficiency the temperature is gradually reduced to a level at which the oxidation continues but at which a further reduction of 2 to 5° F. causes the rate of reaction to decrease suddenly and the oxygen content of the off-gas to increase suddenly. This final temperature is the minimum temperature required to effect the desired oxygen consumption and it is usually from 10 to 20° F. below the temperature at which the oxidation reaction was initiated. This differential between the initiation and final temperature can be reduced by employing oxidation initiators, such as hydroperoxides and the like. The actual oxidation temperature employed in producing alcohols and ketones should not exceed the final temperature, attained in the above manner, by more than 5° F. The relationship between the final temperature and the liquid phase residence time in the reactor is demonstrated by accompanying Figure 2 for an oxygen consumption of 10 mols per 100 mols of methylcyclohexane of 96 per cent purity. The final temperature for a methylcyclohexane stock of 78 per cent purity is 5° F. lower and that for a 99 per cent methylcyclohexane stock is 5° F. higher than that for a 96 per cent stock, all three hydrocarbon feeds having been compared at a residence time of 13 minutes and an oxygen consumption of 10 mols per 100 mols of hydrocarbon. In general, for our process lower temperatures are employed with longer residence times and vice versa. When operating at optimum conditions, as disclosed hereinabove, the oxygen consumption can be greatly increased with a minor or negligible change in temperature, but, when this occurs, the rate of conversion increases and the yield of alcohols and ketones decreases. The relationship between the reaction temperature and the oxygen consumption is shown by Figure 3 when methylcyclohexane is oxidized at a residence time of 13 minutes. In our process with a hydrocarbon fraction containing 96 per cent methylcyclohexane, the optimum operating temperature is 370° F. with a residence time of 2.5 minutes; 320° F. with a residence time of 13 minutes; and 274° F. with a residence time of 60 minutes.

The reactor for our process is provided with suitable means for agitating the reaction mixture, such as a mechanical stirrer or agitator. This mixing device provides adequate and intimate contacting of the oxygen and the hydrocarbon, and it avoids localized reaction zones. In fact, the mixing device is employed to produce a homogeneous mixture in the reactor, and the reaction is effected at substantially isothermal conditions. This latter fact aids in improving the yield of alcohols and ketones obtainable from our process.

During the reaction a gas phase, a hydrocarbon soluble phase, and a hydrocarbon insoluble phase are formed. All three phases are intimately admixed, and no continuous gas phase is present in the reactor. As a result of the agitation the three phases are present in the reaction in a homogeneous mixture. The three phases are withdrawn from the reactor via a single outlet in the top of the reactor, and the reactor is maintained full of liquid throughout the reaction by a back pressure valve. It may be said that our reactor contains a discontinuous gas phase and a discontinuous liquid phase, and the liquid phase is maintained in contact with the top of the reactor. The gas phase withdrawn from the reactor contains, when air is the oxygen-containing gas, nitrogen, unreacted oxygen and hydrocarbon, carbon dioxide, and traces of alcohols, ketones and low-boiling acids. The hydrocarbon soluble phase contains alcohols, ketones, hydroperoxides and low-boiling organic acids and, when methylcyclohexane is oxidized, the alcohols and ketones are methylcyclohexanols, methylcyclohexanones and 2-heptanone. The hydrocarbon insoluble phase contains high-boiling organic acids and polymeric material. In a modification of our process the oxidation reaction may be effected in the presence of an amount of an alkaline material sufficient to neutralize only the organic acids in the hydrocarbon soluble phase, as disclosed in the copending application of one of us, C. F. Dougherty, Jr., Serial No. 123,953, filed October 27, 1949. Alternatively, the organic acids in the hydrocarbon soluble phase may be neutralized with an alkaline material, such as calcium hydroxide, after the three phases are withdrawn from the reaction zone.

After withdrawal from the reaction the mixture of the three phases is passed to a condenser wherein any normally liquid components of the gas phase are liquified. After passing through the condenser the three phases pass to a separator from which the resulting gas phase is withdrawn from the process as off-gas. The hydrocarbon insoluble phase is withdrawn from the bottom of the separator, and it may be treated to recover the high-boiling organic acids. The hydrocarbon soluble phase is withdrawn from an intermediate point in the separator, and the hydroperoxides, alcohols and ketones are recovered therefrom in a suitable manner, such as distillation. Since the hydroperoxides are intermediate products for the production of alcohols and ketones, it is preferred to pass the hydrocarbon soluble phase to a soaking or stabilizing zone, and hydroperoxides decompose to form additional quantities of alcohols and ketones therein. Subsequently the alcohols and ketones are recovered by fractionation or other suitable means as products of the process.

Referring to Figure 1 which is a cross-sectional drawing of a reactor for effecting our process, liquid methylcyclohexane or other hydrocarbon is introduced to reactor 1 via inlet 2. Air, or other oxygen-containing gas, enters the top of the reactor via inlet 3, and it passes via passage 4 and flows through two radial holes in drive shaft 5. Thence the air flows through axial passage 6 in drive shaft 5, and the air enters reactor 1 via a series of holes, one of which is shown as 7, located between the three blades of shrouded rotor 8 which is surrounded by stator ring 9. Drive shaft 5 is connected with a source of power, such as a motor (not shown), which turns shaft 5 causing the revolution of rotor 8. In this manner air is introduced to the reactor in the form of fine bubbles, and the agitation of the reaction mixture by rotor 8 causes intimate contacting of the hydrocarbon and fine air bubbles.

The temperature of the reaction mixture is determined by inserting a thermometer in well 10, and exothermic heat of reaction may be removed from the reactor by circulating a liquid coolant, such as water, through cooling coils 14. In this manner the reaction temperature is maintained within optimum limits for the reaction. Reactor 1 is also provided with a safety outlet 11 or blowout which is connected to a safety head rupturing near the designed working pressure of the reactor. It is particularly important that the internal surface of the reactor be smooth and free of projections which produce eddy currents or semi-quiescent zones in the reactor. The attachment of vertically disposed baffles to the inner walls of the reactor produced unsatisfactory results, and the presence of sharp static edges and static threaded surfaces were found to be objectionable in that they serve as points for the formation and growth of polymeric material.

The reaction effluent is withdrawn from the reactor via passage 12 and outlet 13. The effluent thus withdrawn is a mixture of gas phase and hydrocarbon soluble and insoluble phases from the reaction, and it is withdrawn at such a rate that the reactor is maintained full of liquid.

By the partial oxidation process disclosed herein we have obtained 10 to 15 per cent conversions of liquid hydrocarbons, such as cycloalkanes, and from the hydrocarbons oxidized we have obtained 80 per cent and higher yields of cycloalkanols and cycloalkanones.

*Example*

A cycloalkane concentrate containing 86 mol per cent methylcyclohexane was passed to a reactor similar to that shown in Figure 1. Air was also introduced to the reactor at a rate sufficient to produce a molar ratio of oxygen to hydrocarbon of 0.1. The operating temperature was 320° F. with a residence time of 13 minutes, and the reactor pressure was 500 pounds per square inch gauge. A conversion of 9.3 per cent of the methylcyclohexane was obtained with a 91 weight per cent yield of methylcyclohexanols, methylcyclohexanones and 2-heptanones based on the methylcyclohexane reacted. The productivity was 6.6 gallons of the above the $C_7$ alcohols and ketones per gallon of reactor capacity per day.

From the above disclosure various modifications and embodiments within the purview of our invention will be apparent to those skilled in the art.

We claim:

1. The process for the oxidation of a hydrocarbon feed selected from a group consisting of $C_4$ to $C_{20}$ cycloaliphatic hydrocarbons under liquid phase conditions which comprises continuously introducing said hydrocarbon feed to the bottom of a reaction chamber at a rate such that a residence time of said hydrocarbon in said reaction chamber is within the range of 1 to 60 minutes; maintaining a pressure in said reaction zone in the range of 50 to 3000 p. s. i. and sufficient to maintain said hydrocarbons in liquid phase; maintaining said hydrocarbon at an oxidizing temperature within the range of 230° to 450° F. by passing a fluid heat exchange medium circuitously through the hydrocarbon mass in indirect heat exchange therewith; rotating a portion of said hydrocarbon as a liquid mass in a smooth walled mixing zone within the lower portion of said reaction chamber, whereby eddy currents and semi-quiescent zones are substantially avoided; continuously introducing free oxygen outwardly into said rotating liquid mass at a rate such that the molar ratio of oxygen-to-hydrocarbon is maintained within the range of 0.05 to 0.2 whereby said hydrocarbon is oxidized and a homogeneous mixture is produced of a gaseous phase, hydrocarbon soluble phase and hydrocarbon insoluble phase, continuously withdrawing through outlet means in the top of said reaction chamber said homogeneous mixture at a rate such that such reaction chamber is maintained liquid-full, and recovering from said withdrawn homogeneous mixture resulting oxidation products corresponding to said hydrocarbon feed.

2. The process of claim 1 wherein said cycloaliphatic hydrocarbon is cyclopentane.

3. The process of claim 1 wherein said cycloaliphatic hydrocarbon is cyclohexane.

4. The process of claim 1 wherein said cycloaliphatic hydrocarbon is cycloheptane.

5. The process of claim 1 wherein said hydrocarbon feed is an alkyl-substituted naphthenic hydrocarbon.

6. The process of claim 1 wherein said homogeneous mixture includes an oxidate comprising a mixture of hydroperoxide, alcohols and ketones.

7. The process of claim 1 wherein said oxidation is carried on at a temperature within the range of 230 to 300° F.

8. The process of claim 7 wherein said withdrawn homogeneous mixture contains an oxidate comprised essentially of hydroperoxides.

9. The method of claim 1 wherein said oxidation is carried on at a temperature within the oxygen is introduced into said mixing zone at a rate such that the molar ratio of oxygen-to-range of 320 to 370° F.

10. The process of claim 1 wherein said free hydrocarbon is maintained within the range of between 0.07 and 0.2

11. A process according to claim 1 wherein the hydrocarbon enters the reaction chamber at the bottom thereof and wherein the air is introduced to the reaction chamber through an axial passage in the drive shaft of a mechanical agitator.

12. A process according to claim 1 wherein the naphthenic hydrocarbon is methylcyclohexane and wherein the alcohols and ketones recovered are methylcyclohexanols, methylcyclohexanones and 2-heptanone.

13. A process according to claim 12 wherein the hydrocarbon residence time is 13 minutes and wherein the reaction temperature is 320° F.

14. A process according to claim 12 wherein the hydrocarbon residence time is 2.5 minutes and wherein the reaction temperature is 370° F.

CHARLES FRANCIS DOUGHERTY, JR.
CHARLES C. CHAPMAN.

REFERENCES CITED

The following references are of record in the file of this patent:

UNITED STATES PATENTS

| Number | Name | Date |
|---|---|---|
| 1,663,523 | Reid | Mar. 20, 1928 |
| 2,223,494 | Loder | Dec. 3, 1940 |
| 2,410,642 | Farkas et al. | Nov. 5, 1946 |
| 2,447,400 | Emerson et al. | Aug. 17, 1948 |
| 2,452,741 | Fleming | Nov. 2, 1948 |
| 2,475,605 | Prutton et al. | July 12, 1949 |

FOREIGN PATENTS

| Number | Country | Date |
|---|---|---|
| 405,719 | Great Britain | Feb. 15, 1934 |